Jan. 5, 1960

W. H. PECK 2,920,192

PULSE GENERATOR

Filed Nov. 23, 1953

INVENTOR:
William H. Peck
BY
Walter J. Jason
ATTORNEY

United States Patent Office 2,920,192
Patented Jan. 5, 1960

2,920,192
PULSE GENERATOR

William H. Peck, Pomona, Calif., assignor, by mesne assignments, to General Dynamics Corporation, a corporation of Delaware Application November 23, 1953, Serial No. 393,649

8 Claims. (Cl. 250—27)

Timed electrical pulses are utilized extensively in the general field of electronics and especially in the fields of radar, pulse code communications, and digital computation. In radar systems, for example, accurately timed electrical pulses are required throughout most of the system and in addition accurate standards must be available for periodic testing and maintenance of the system as well as particular units of the system such as the range marking circuits.

Generally, the accuracy and reliability of equipment utilizing timed pulses is directly related to the accuracy of these pulses and, therefore, considerable effort has been directed toward the realization of a reliable precision pulse generator. General requirements of a timing pulse generator, whether utilized in the functional equipment or in test equipment, are accurate phase registration, minimum pulse rise time, temperature stability, and accuracy which is independent of the actuating impulses.

Resistance-capacitance, inductance-capacitance, and crystal oscillators have been used heretofore as precision pulse generators, however, each has possessed one or more undesirable characteristics. The crystal type of pulse generator, due to its inherent accuracy, has offered the most promise but heretofore it has been difficult to control the initiation of the output signal with any degree of precision.

Since some of the inaccuracies of the prior crystal type pulse generators resulted from variations in time delay between the actuating impulse and the first output pulse of the generator, pulse transformers and various types of bridge circuits were incorporated to stabilize this variable time delay factor. In addition to the added expense of these stabilizing devices and the further complication of the pulse generator, the pulse transformers possessed undesirable temperature characteristics. The bridge circuits have been equally unsatisfactory since they are balanced at but one frequency and, therefore, could not adequately balance a pulse which contains many frequencies and hence undesirable distortions appear at the initiation of the output train.

Pulse transformers and various types of bridge circuits have been used hitherto in stabilizing the time delay between the initiating pulse and the output train, and segregating the input pulse from the output.

It is, therefore, an object of this invention to provide an accurate source of timed electrical pulses capable of precise control.

Another object of this invention is to provide a source of accurately timed pulses in response to a relatively inaccurate trigger pulse.

Another object of this invention is to provide a source of accurately timed pulses of substantially uniform amplitude.

Another object of this invention is to provide a precisely timed pulse source substantially independent of environmental conditions.

Another object of this invention is to provide a source of narrow, high-frequency pulses initiated by relatively random low-frequency pulses.

A further object of this invention is to provide a pulsed crystal oscillator without undesirable side modes.

A further object of this invention is to provide a reliable, simplified, and inexpensive pulsed crystal generator.

Other objects and features of this invention will be readily apparent to those skilled in the art from the following specification and appended drawings, in which.

Figure 1:
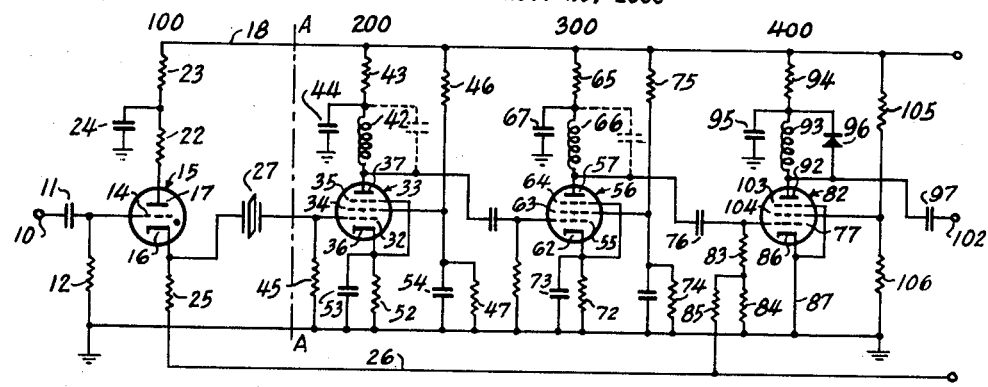
Figure 1 is a schematic diagram illustrating one embodiment of the present invention.

Referring to the schematic drawing shown in Figure 1, positive input triggering impulses are applied to input terminal 10 through blocking capacitor 11 and across a high resistance grid resister 12 to control electrode 14 of electron discharge device 15 in pulsing stage 100. Electron discharge device 15 may be a three-electrode, gas-filled tube of the thyratron type having in addition to control grid 14, a cathode 16 and anode 17. The anode 17 is connected to a power source (not shown) by means of a positive high-voltage bus 18 through low resistance discharge control resistor 22 and high resistance load resistor 23. Discharge-sustaining capacitor 24 is connected between the junction of resistors 22 and 23 and ground. A cathode resistor 25 is connected between the cathode 16 of thryratron 15 and a negative voltage source (not shown) by means of negative voltage bus 26. One terminal of a crystal unit 27 is connected to cathode 16 of thyratron 15.

Figure 4:
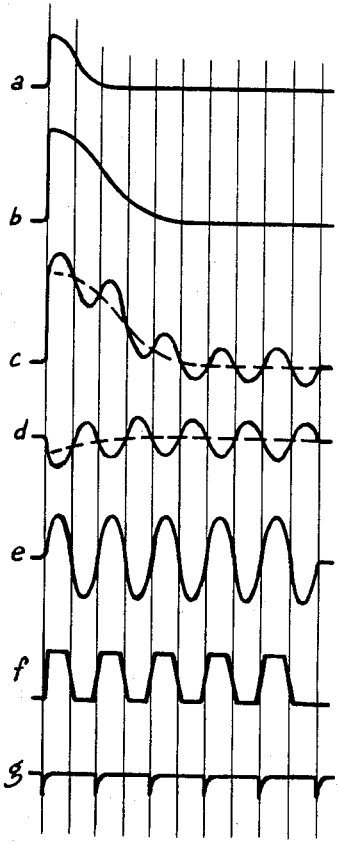
Figure 4 shows time relationships of the various circuits and the waveforms illustrating the operation of the embodiment of Figure 1.

Under quiescent conditions, thyratron 15 is non-conductive and during this period capacitor 24 is being charged to substantially the potential of the source (not shown). With the application to control grid 14 of thyratron 15 via input terminal 10 and blocking condenser 11 of a suitable positive triggering pulse, such as that shown in Figure 4a, the voltage on control grid 14 will be raised sufficiently to cause ionization of thyratron 15 and thereby allow current to flow between anode 15 and cathode 16. Upon triggering of the thyratron 15 into its conductive condition, the sustaining capacitor 24 discharges through resistor 22, thyratron 15, and cathode resistor 25. The charge stored on capacitor 24 during the quiescent period provides sufficient current flow through the relatively low resistance discharge path afforded by the conduction of thyratron 15 to sustain ionization and conduction even after the input pulse applied to control grid 14 has been removed. The current supplied by sustaining capacitor 24 which flows through tube 15 is a function of the time constant of the discharge circuit and the charge appearing on the capacitor 24 and is independent of the input pulse impressed on the control grid 14. Hence, the potential developed across the cathode resistor 25, as illustrated in Figure 4a, will be independent of the size, shape, or other characteristics of the input triggering pulse. This output pulse developed by the pulsing stage 100, which appears across cathode resistor 25, is applied to crystal unit 27.

Figure 2:
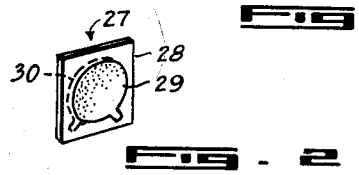
Figure 2 illustrates the construction of the piezoelectric crystal shown in Figure 1.

The general configuration of the crystal unit 27 is illustrated in Figure 2. The desirable properties of conventional piezoelectric resonators, such as low temperature coefficient, high piezoelectric activity, and a frequency spectrum containing only one resonant frequency, are likewise desirable properties of piezoelectric crystal 27. Although an infinite variety of shapes and orientations of crystals are available, it has been found that an AT-cut for plate 28 yields good results since this cut is characterized by substantially zero temperature coefficient and high piezoelectric activity. It is well known that quartz crystals can and may oscillate in any or all of several modes, each of which has its characteristic frequency. While one mode of oscillation is more easily excited than another, it is possible for coupling between modes to exist so that excitation of one mode will induce excitation of another. This condition results in an output signal containing two or more frequencies which are not harmonically related and thereby renders such a crystal useless as a precision source of timing signals. It has been found that damping of the crystal will reduce vibrations in all modes, however, with the proper amount of damping only the principal mode will produce voltages. Thus, the quartz plate 28 may have its opposite surfaces covered by conductive coatings 29 and 30 to the extent of approximately 90%. This techinque has been found to substantially eliminate any undesirable oscillations of the crystal and thus render it useful as a source for the timed pulse developed by the associated circuits.

Figure 3:
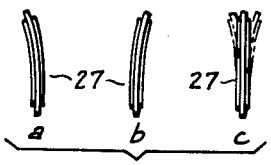
Figures 3a, 3b and 3c illustrate the operation of the crystal of Figure 2.

Since, as described hereinbefore, one side of crystal 27 is connected to negative high voltage bus 26 through resistor 25, under quiescent conditions the crystal will be flexed as illustrated in Figure 3a. When the thyratron 15 fires, a positive voltage pulse of the form shown in Figure 4b is applied to the crystal 27, which will cause the crystal to flex in the opposite direction, as shown by Figure 3b. As the positive pulse decays, the crystal will flex back and vibrate mechanically, as illustrated in Figure 3c, at its natural resonant frequency in a manner similar to a bell that has been struck.

Referring again to Figure 1, crystal 27 is connected in series relationship between cathode 16 of thyratron 15 and control grid 32 of electron-discharge device 33 in high-frequency amplifier stage 200. Electron-discharge device 33 may be a high vacuum type tube having in addition to control grid 32, a screen grid 34, suppressor grid 35, cathode 36 and anode 37. Anode 37 is connected to high-voltage bus 18 through an inductor 42 and load resistor 43. Bypass capacitor 44 is connected between the junction of inductance 42 and resistor 43 and ground. Grid return resistor 45 is connected between control grid 32 and ground. Suitable operating potential for screen grid 34 is supplied by a voltage divider comprising resistor 46 and resistor 47 which may be connected between the high voltage bus 18 and ground. Suitable grid bias voltage may be furnished by a cathode resistor 52 interconnected with the cathode 36 to which is also connected a bypass condenser 53. A bypass condenser 54 is also provided across screen resistor 47.

Amplifier stage 200 is a more or less conventional radio-frequency amplifier with its plate circuit tuned by inductance 42 to approximately the natural resonant frequency of the crystal unit 27. By utilizing such a circuit a high impedance is presented in the plate circuit of the pentode 33 at the resonant frequency and frequencies closely related thereto whereas at frequencies displaced from the resonant frequency considerably lower impedances are presented. Hence, the desired frequency, that is the resonant frequency of the crystal unit 27, appears at the anode 37 as highly amplified signal, whereas the low frequency ringing pulse component is greatly attenuated by virtue of the very low impedance presented by the tuned circuit at this frequency.

The amplified signal frequency developed at the anode 37 of amplifier stage 200 is applied to control grid 55 of electron tube 56 in second amplifying stage 300. The tube 56 comprises, in addition to control grid 55, an anode 57, cathode 62, screen grid 63 and suppressor grid 64.

Amplifier stage 300 is functionally similar to amplifier stage 200 with anode 57 connected to the high voltage bus 18 through inductor 66 and load resistor 65. Bypass capacitor 67 is connected from the junction of inductor 66 and resistor 65 to ground. Suitable grid bias voltage is furnished the tube 56 by the combination of resistor 72 and capacitor 73 connected between the cathode 62 and ground. Suitable operating potential for screen grid 63 is afforded by a voltage divider, comprising resistors 74 and 75, which is connected across the high voltage bus 18.

Tuned amplifier stage 300 provides further selective amplification of the desired crystal signal and this signal, which appears at the anode 57 of tube 56, is capacitively coupled by capacitor 76 to control grid 77 of electron tube 82. The control grid 77 is operated beyond cutoff by virtue of a large negative bias voltage applied to it by means of negative high potential lead 26, a resistor 83 and a voltage divider formed by resistors 84 and 85. Cathode 86 of tube 82 is connected directly to ground potential by means of lead 87, and anode 92 is connected to the positive high voltage bus 18 through inductance 93 and resistor 94. Bypass capacitor 95 is connected between the junction of coil 93 and resistor 94 and ground. A diode 96, preferably of the semi-conductor crystal type, is connected in parallel with inductance 93. Electron tube 82 comprises, in addition to anode 92, cathode 86 and control grid 77, a suppressor grid 103 and a screen grid 104, which is maintained at proper operating potential by means of a voltage divider formed by resistors 105 and 106 connected across the power source (not shown).

The fundamental sinusoidal signal generated by crystal unit 27, which appears with amplified magnitude at the anode 57 of second amplifier stage 300, is applied to the control grid 77 of shaping circuit 400. The amplitude of the signal impressed on grid 77 is sufficient not only to overcome the heavy negative bias voltage applied to the tube 82 but also to overdrive tube 82 and thus convert the sinusoidal input wave into a nearly square current waveform. Inductor 93 in the plate circuit of electron tube 82 serves to convert this current waveform into a series of spikes. Rectifier 96, connected in the manner shown in Figure 1, attenuates the positive spikes but allows the negative spikes which appear at the anode 92 to be coupled by capacitor 97 to output terminal 102. Thus, negative voltage spikes having a repetition rate controlled by the natural resonant frequency of crystal unit 27 are produced on output terminal 102.

In operation of the timed pulse generator illustrated in Figure 1, input pulses of the form illustrated by Figure 4a and supplied from any suitable source, such as a radar system modulator or oscilloscope sweep circuit, are applied to input terminal 10. These input pulses are not critical as to waveform and need only be of sufficient magnitude when applied to control grid 14 of thyratron 15 to fire the tube which is normally non-conductive. When thyratron 15 is driven into conduction by the input pulse, capacitor 24 discharges through thyratron 15 to sustain ionization and changes the capacitance formed by the crystal assembly 27 thereby flexing the crystal as shown in Figure 3b. The voltage on the capacitance formed by the crystal assembly raises the voltage on cathode 16 of thyratron 15 until the de-ionization of thyratron 15 is reached whereupon plate current ceases to flow therethrough and capacitor 24 commences its charging cycle in preparation for the next input pulse. During the period thyratron 15 is cut-off, the capacitance of crystal unit 27 begins charging back to the negative potential of bus 26. The time constant of the negative charging path allows the ringing voltage on the crystal to be altered gradually, as shown in Figure 4b. However, it should be understood that the trailing edge of this pulse need not be gradual but may have a fall time approaching the rise time of the leading edge.

As the crystal 27 vibrates at its natural resonant frequency it generates a sinusoidal voltage, as shown by Figure 4c, which is applied to control grid 32 of tube 33 of amplifier stage 200. The relatively low frequency produced by the ringing pulse is effectively attenuated and an amplified sine wave, as shown by Figure 4d, appears at anode 37 of tube 33. This signal is applied to the electron tube 56 of amplifier stage 300, as in the case of amplifier stage 200, its plate circuit, including inductance 66 and the distributed capacitance, is tuned to the characteristic frequency of crystal 27. Thus, the sinusoidal signal is further amplified and the ringing pulse is eliminated, as illustrated in Figure 4e. This signal is taken from the anode 57 of tube 56 and capacitively coupled to control grid 77 of tube 82 which is connected as combined shaper, peaker, and comparator circuit. As mentioned hereinbefore, tube 82 is normally non-conductive and operated well below cut-off. The amplified signal voltage applied to control grid 77 should be of such a magnitude that the tube will become conductive and be driven to a saturated current condition below the maximum swing of the signal voltage applied to the grid 77. Hence, the circuit functions as an overdriven amplifier. Under such conditions the resultant plate current will have a somewhat trapezoidal wave shape, as illustrated by Figure 4f. Inductor 93 in the plate circuit of shaper stage 400 with diode 96 connected thereacross serves to peak the current wave illustrated in Figure 4f and effectively attenuates the positive peaks. Hence, only the negative pulses appear on output terminal 102, as shown in Figure 4g.

It, therefore, becomes apparent that this train of negative output pulses is produced at a repetition rate established by the natural resonant frequency of the crystal 27. Furthermore, since the high amplitude ringing pulse, overcomes the vibratory inertia of the crystal and phases the vibrations to synchronize with each ringing pulse, the timed output pulses are phase locked to the random trigger pulse.

The present invention is usable over an extremely wide range of input pulse frequencies and, furthermore, these trigger pulses may be relatively random in time. The only restriction on the repetition frequency of the ringing pulses is the time constant of the resistor 27-capacitor 24 combination determining the time required to recharge capacitor 24, and the decay of crystal vibration.

Figure 5:
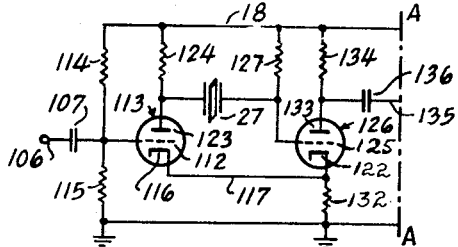
Figure 5 illustrates another embodiment of this invention.
Figure 6:
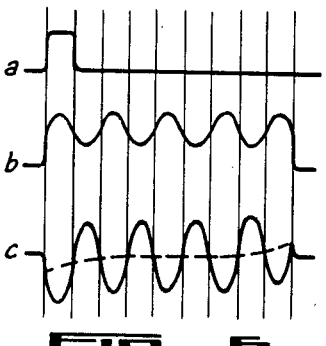
Figure 6 is a graph showing the time relationship and waveforms in the operation of the embodiment illustrated in Figure 5.

Figure 5 illustrates a modification of the present invention which allows an even higher ringing pulse frequency and provides a train of timed output pulses for a time duration determined by the time constant of a resistor-capacitor combination. In this embodiment a suitable pulse, as illustrated in Figure 6a, is applied to input terminal 106 and through blocking capacitor 107 to control electrode 112 of vacuum tube 113. A voltage divider, comprising resistors 114 and 115 which are serially connected between the high voltage bus 18 and ground, provides the proper grid bias voltage for tube 113. Cathode 116 of tube 113 is connected by lead 117 to a common cathode resistor 122. Anode 123 is connected both to a power source (not shown) through a plate resistor 124 and high voltage bus 18 and to one terminal of quartz crystal 27, which is constructed in a manner hereinbefore described. The other terminal of crystal 27 is connected to control grid 125 of electron tube 126, as well as to high voltage bus 18 through resistor 127. Cathode 132 of tube 126 is connected to ground through the common cathode resistor 122 and the plate circuit is completed by connecting anode 133 to bus 18 through plate resistor 134. Output terminal 135 is connected to anode 133 through blocking capacitor 136.

Under quiescent conditions triode 113 is in its non-conductive condition whereas triode 126 is conducting at saturation. As the leading edge of the pulse, as shown in Figure 6a, is applied to the control grid 112, tube 113 will become conductive and the voltage appearing at the anode 123 will be instantaneously driven downwardly, thereby shock exciting the crystal 27, which generates a sinusoidal signal, as illustrated in Figure 6b. With tube 113 in its conductive state, the added voltage drop in common cathode resistor 122 caused by the current flowing in tube 113 will raise the voltage of cathode 132 of triode 126 and thereby convert the operating conditions of the circuit from saturation to substantially class A operation. Hence, the sinusoidal signal generated by crystal unit 27 as a result of its excitation is applied to control grid 125 of tube 126 and appears as an amplified signal at the anode 133. This sinusoidal signal continues to be amplified by the tube 126 until the capacitance of the crystal unit 27 discharges through resistor 127 and re-establishes the positive bias on tube 126. During this period the signal appearing on output terminal 135 is illustrated in Figure 6c. As will be apparent to one skilled in the art, output terminal 135 may be connected to the control grid 32 of tube 33 in amplifier stage 200 as shown in Figure 1 and described hereinbefore. With the circuit of Figure 5 substituted for pulsing stage 100, as shown to the left of line A—A in Figure 1, the sinusoidal signal will be operated upon and converted to precision timing pulses which appear on output terminal 102.

Upon discharge of the capacity of crystal 27, tube 113 is restored to its non-conductive condition and tube 126 is restored to its saturated conductive condition thereby blocking the sine wave generated by crystal 27 from the output terminal 135. The application of succeeding input pulses to the control grid 112 of tube 113 will re-excite crystal unit 27 and rephase the generated signal to coincide with the leading edge of the input pulse even though signals generated by previous actuating pulses have not been damped out.

While certain preferred embodiments of the invention have been specifically disclosed, it is understood that the invention is not limited thereto as many variations will be readily apparent to those skilled in the art and the invention is to be given its broadest possible interpretation within the terms of the following claims.

What I claim is:

1. A pulse generator for producing a series of timed electrical pulses comprising a piezoelectric crystal, means for applying an electrical potential to prestress said crystal, means for altering said potential to allow said crystal to vibrate and produce an electrical signal, and means for producing a series of electrical pulses from said electrical signal.

2. A pulse generator for producing timed electrical pulses comprising a piezoelectric crystal, an electrical circuit for applying an electrical potential to pre-stress said crystal, means for altering said potential to allow said crystal to vibrate and produce a signal, said means comprising a trigger circuit adapted to be triggered by electrical impulses, and means for producing electrical pulses from said crystal signal.

3. A pulse generator for producing timed electrical pulses comprising an electromechanical oscillator, an electrical circuit for applying an electrical potential to pre-stress said oscillator, means for altering said potential to allow said oscillator to vibrate and produce a signal, said means comprising a trigger circuit having an input terminal adapted to be coupled to a source of electrical pulses and an output terminal, means for producing electrical pulses from said oscillator signal, said oscillator being serially connected between said output terminal and said last named means.

4. A pulse generator for producing timed electrical pulses comprising an electromechanical oscillator, an electrical circuit for applying an electrical potential to pre-stress said oscillator, means for altering said potential to allow said oscillator to vibrate and produce a signal, said means comprising a trigger circuit adapted to be triggered by electrical impulses and having means associated therewith for providing a gradual release of the force applied to said oscillator, and means for producing electrical pulses from said oscillator signal.

5. A pulse generator for producing timed electrical pulses comprising an electromechanical oscillator, an electrical circuit interconnected with said oscillator for applying an electrical potential to pre-stress said oscillator, means for reducing said potential to allow said oscillator to vibrate and produce a sinusoidal signal, said means comprising a trigger circuit having an input terminal adapted to be coupled to a source of electrical pulses and an output terminal serially connected with said oscillator, tuned amplifier means for amplifying said signal, and shaping circuits associated with said amplifier means for producing a chain of pulses having a fixed relationship with said signal.

6. A pulse generator for producing timed electrical pulses comprising a piezoelectric crystal for producing chains of sinusoidal signals in response to trigger pulses, means for applying an electrical potential to pre-stress said crystal, circuit means interconnecting a source of trigger pulses and said crystal for reducing said potential to allow said crystal to vibrate and produce a chain of sinusoidal signals with a predetermined phase relationship between each chain of sinusoidal signals and said trigger pulses, amplifier means responsive to signals generated by said crystal, and shaping circuits associated with said amplifier means for producing chains of electrical pulses.

7. A pulse generator for producing timed electrical pulses comprising a piezo-electric crystal, an electrical circuit for applying an electrical potential to said crystal to pre-stress said crystal, means for altering said potential to allow said crystal to vibrate and produce a sinusoidal signal, said means comprising a trigger circuit adapted to be triggered by electrical impulses, a tuned amplifier for amplifying said sinusoidal signal, said crystal being serially connected between the input of said tuned amplifier and the output of said trigger circuit, and a pulse former connected to the output of said tuned amplifier for producing a series of timed electrical pulses from said sinusoidal signal.

8. A pulse generator for producing timed electrical pulses comprising a piezo-electric crystal, an electrical circuit for applying an electrical potential to pre-stress said crystal, means for reducing said potential to allow said crystal to vibrate and produce a sinusoidal signal, said means comprising a trigger circuit having a conducting state and a normal non-conducting state, and means for applying a trigger pulse to said trigger circuit to switch said trigger circuit from said non-conducting state to said conducting state, thereby reducing said electrical potential applied to said piezo-electric crystal, a tuned amplifier for amplifying said sinusoidal signal, said piezo-electric crystal being serially connected between the input of said tuned amplifier and the output of said trigger circuit, and a pulse shaper connected to the output of said tuned amplifier for converting said sinusoidal signal into a train of timed electrical pulses.

References Cited in the file of this patent

UNITED STATES PATENTS

| | | |
|---|---|---|
| 1,996,878 | Ohl | Apr. 9, 1935 |
| 2,240,420 | Schnitzer | Apr. 29, 1941 |
| 2,438,904 | De Rosa | Apr. 6, 1948 |
| 2,449,848 | Hefele | Sept. 21, 1948 |
| 2,488,290 | Hansell | Nov. 15, 1949 |
| 2,510,868 | Day | June 6, 1950 |
| 2,553,366 | Fry | May 15, 1951 |
| 2,562,449 | Delano | July 31, 1951 |
| 2,676,273 | Oestreicher | Apr. 20, 1954 |

OTHER REFERENCES

Waveforms, by Chance et al., vol. 19 of the "Radiation Laboratory Series," published by McGraw-Hill Book Co., Inc., 1949, pages 145–148.